United States Patent [19]

Le Ribault et al.

[11] Patent Number: 4,553,597
[45] Date of Patent: Nov. 19, 1985

[54] PROCESS FOR ELIMINATING CLAYS FROM ROCKS AND SEDIMENTARY ENVIRONMENTS

[75] Inventors: Loïc P. Le Ribault, La Teste de Buch; Jacques P. Donoguès, Talence; Norbert C. Duffaut, Podensac, all of France

[73] Assignee: Lamothe, Boulan, Dunogues, Duffaut, and Ribault, France

[21] Appl. No.: 515,603

[22] Filed: Jul. 21, 1983

[30] Foreign Application Priority Data

Jul. 21, 1982 [FR] France ............... 82 12856

[51] Int. Cl.$^4$ ............ E21B 43/22; E21B 43/27; C09K 3/00
[52] U.S. Cl. ............ 166/305 R; 252/8.55 R; 208/11
[58] Field of Search ............ 252/8.55 R; 166/275, 166/305 R; 208/11; 106/287.14, 287.15; 524/588

[56] References Cited

U.S. PATENT DOCUMENTS

| | | | |
|---|---|---|---|
| 4,149,978 | 4/1979 | Goffinet | 252/8.6 |
| 4,197,912 | 4/1980 | Barnhouse | 166/305 R |
| 4,284,532 | 8/1981 | Leikhim et al. | 252/173 |

Primary Examiner—Paul Lieberman
Assistant Examiner—Robert A. Wax
Attorney, Agent, or Firm—Robert J. Koch

[57] ABSTRACT

Process for eliminating clays from rocks and sedimentary environments, in particular rocks that are reservoirs of hydrocarbons, and/or water, and/or natural gas, or bituminous schists, or asphaltic sands, comprises applying into the said sedimentary environments or rocks organo-silicon compounds selected from:

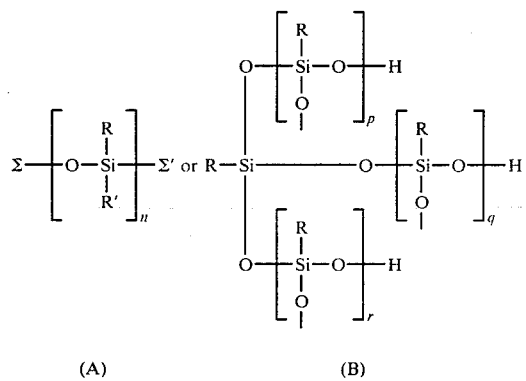

(A)                (B)

wherein:

n is a whole number between 1 and 1,000 and preferably between 1 and 50;

p, q and r are whole numbers between 0 and 1,000 and preferably between 0 and 50;

R and R' are selected from the group consisting of aliphatics, cycloaliphatics, olefinics, aromatics; heteroatom-containing aliphatics, cycloaliphatics, olefinics and aromatics; and combinations of the above; R can also be OH, OR or $OSiR_3$;

$\Sigma$ is selected from R, H, and $SiR_3$;

$\Sigma'$ is selected from R, OR, OH, $OSiR_3$.

5 Claims, No Drawings

PROCESS FOR ELIMINATING CLAYS FROM ROCKS AND SEDIMENTARY ENVIRONMENTS

The present invention relates to the elimination of clays from rocks and sedimentary environments, in particular rocks that are reservoirs of hydrocarbons, and/or water, and/or natural gas, or bituminous schists, or asphaltic sands, and applies particularly to assisted recovery of oil, to geothermy and to the development of continental and marine aquatic environments.

Especially in the field of oil extraction one is often hampered by the presence of clays in the pores of the reservoir rock, which restrain or even prevent extraction.

The techniques generally used for the improvement of permeability call for the injection of various products of which the most currently used are micro-emulsions similar or identical to those listed hereafter in the present description. Now, observation by electronic microscope of a sandstone rich in clay after treatment by such micro-emulsions shows that the clays are not changed by the treatment, at most they are slightly displaced. Consequently, very little oil is recovered in this way, the permeability only being improved over a small area around the points of injection of the products usually used.

The object of the present invention is particularly to improve the assisted recovery of oil by using another range of products which do not simply displace the clays but dissolve them and so clear the pores.

To this effect, the object of the invention is a process for eliminating clays from rocks and sedimentary environments, especially rocks that are reservoirs of hydrocarbons, and/or water, and/or natural gas, or bituminous schists or asphaltic sands, consisting in applying into the said sedimentary environments or rocks organo-silicon compounds of one of these two formulae:

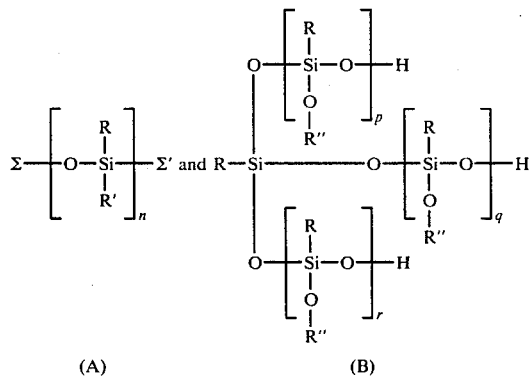

(A)          (B)

in which:

$n$ is a whole number between 1 and 1,000 and preferably between 1 and 50;

$p$, $q$ and $r$ are whole numbers between 0 and 1,000 and preferably between 0 and 50;

R and R′ represent a group that is linear aliphatic, branched or cyclic, saturated or not, branched hetero-linear or not, saturated cyclic or not, aromatic, heteroaromatic, aryl-aliphatic or hetero-aryl-aliphatic, which can be equally functional, or a combination of these various possibilities; R can also be OH, OR, or $OSiR_3$.

$\Sigma$ being R, or H, or $SiR_3$;

$\Sigma'$ being R and more particularly Me, or OR, or OH, or $OSiR_3$.

R″ being R, R′, $\Sigma$ or a di or trifunctional polysiloxane chain formation in which the silicon substituents are R, OH or OM, M being a potassium atom.

The various organo-silicon compounds above are products intrinsically known.

One can use those available commercially or else start from precursors which generate them by hydrolysis, for example silazanes or alkoxysilanes.

These compounds can be used effectively in some cases in solution or in aqueous suspension, and generally are always active in the presence of micro-emulsions.

To neutralize and possibly stabilize the compounds of type (B) the presence of one or more organic acids (or their salts, particularly alkaline) such as salicylic acid, citric acid, propionic acid, aspartic acid, glutaric acid and glutamic acid, is desirable, at least in certain cases. The organo-silicon compounds of the invention can be mixed among themselves or not, and used alone or in aqueous solution of a concentration of 0.0001 to 30% by weight, and more particularly from 0.001 to 5%.

The micro-emulsions used can be of classical type, that is to say systems that are colloidal, transparent homogeneous and microscopically structured, generally composed of four components: water, hydrocarbon, tension-active and co-tension-active. To define micro-emulsions one can refer for example, to the articles by J. H. Schulman and collaborators (Trans. Faraday. Soc, 36, 651 (1940) or Nature 152, 102 (1943), or else the book "Micellization, Solubilisation and Micro-emulsions", vol 1, Edition K. L. Mittal, Plenum Press, New York and London (1977), or else the French Pat. No. 2,119,274.

Among micro-emulsions to be used can be quoted also those described in French Pat. No. 2,205,358.

The proportion by weight of silicon derivatives in the micro-emulsions can vary very widely according to the compositions used. The micro-emulsions bring either a potentiality of the properties of the solutions or the suspensions of the organo-silicon compounds used, or they bring an effectiveness that does not appear noticeably in their absence. Micro-emulsions used alone have no noticeable effect.

The working method used consists in immersing the chosen sample, generally, although not necessarily, in cylindrical (or parallelepipedic) of 1.5 cm diameter and 1 cm high, without stirring, in a beaker of 40 or 100 cm³ containing the chosen composition; the temperature can vary from ambient temperature to 130° C., and the duration can also be very variable, going, in the given examples, from 5 minutes to 1 hour.

Obviously, in the field, the temperature can be lower than 20° C. (in lakes, for example) or can go up to 200° C., under pressure, during assisted recovery of oil, without the principle of the effectiveness of the silicon agent itself being questioned. The duration of the operation can also be very variable, and reach several months or even much more.

The rocks were observed before and after treatment by means of a scanning electronic microscope (type CAMECA MEB 07) at various enlargements between 1,000 and 10,000 times.

EXAMPLE 1

A sample of siliceous sandstone defined as previously with pores clogged by clays of dickite and illite types was observed under a scanning electronic microscope.

The sample was immersed in a beaker filled with water brought to a temperature near to boiling for one hour.

After examination under the scanning electronic microscope, no appreciable change was noted in the clay plaquettes or platelets.

A similar sample to the preceding one was then immersed in a micro-emulsion made up as follows: (water 50% by weight, sodium dodecylbenzene sulphonate 13%, n-butanol 26%, cyclohexane 11%). It was heated for one hour to 90°–95° C.

Again in this case no appreciable change was noted in the clay plaquettes.

A third sample identical to the preceding ones was immersed in a beaker containing hexamethyldisiloxane $(Me_3Si)_2O$.

After heating for one hour, close to boiling point, with or without stirring or cooling, no appreciable change was noted in the clay plaquettes.

Under the same experimental conditions a mixture was used made up of 10% of hexamethyldisiloxane and 90% of water by weight. Again no appreciable change was noted in the clay plaquettes.

A new sample, identical to the preceding ones, was immersed under the same conditions as before in a mixture made up of 10% by weight of hexamethyldisiloxane and 90% of the micro-emulsion previously described.

After heating for one hour to 90°–95° C., a very clear morphological change was noted in the clay plaquettes consisting of a reduction in their size and a rounding of their outline.

EXAMPLE 2

A sample identical to the preceding ones was immersed in a beaker containing silicone oil (viscosity $10^{-4}$ m$^2$/s).

After heating for one hour to 90°–95° C., no appreciable change was noted in the clay plaquettes.

The same thing occurred when a sample was heated to 90°–95° C. for one hour, with stirring, in a mixture made up of 10% of silicone oil (viscosity $10^{-4}$ m$^2$/s) and 90% of water by weight.

An identical sample to the preceding ones was immersed in a beaker containing a mixture made up of 10% by weight of the same silicone oil and 90% of the micro-emulsion previously described.

After heating to 130° C., with stirring for only five minutes, observation under the scanning electronic microscope showed that all the plaquettes had disappeared from the surface of the rock. Further, in the pores, about 10% of the plaquettes had gone and all those that remained showed profound morphological change consisting of rounding of their outlines.

EXAMPLE 3

An identical sample to the preceding ones was immersed in a beaker containing diphenylsilanediol.

After heating to 130° C. for one hour and cooling, no appreciable change was noted in the clay plaquettes.

The same thing occurred when a new sample was heated to 130° C. for one hour with stirring, in a mixture made up of 10% by weight of diphenylsilanediol and 90% of water.

An identical sample to the preceding ones was immersed in a beaker containing a mixture made up of 10% of diphenylsilanediol and 90% by weight of the micro-emulsion previously described.

After heating to 130° C. for one hour, with stirring, a very clear morphological change was noted in the clay plaquettes, consisting of a rounding of their outlines.

EXAMPLE 4

An identical sample to the preceding ones was immersed in a beaker containing an aqueous solution made up as follows; into a beaker containing 500 cm$^3$ of water and 17 grams of sodium bicarbonate, previously cooled by means of crushed ice, is introduced slowly, while stirring strongly, 13 grams of dimethyldichlorosilane. A check is made that the pH is near to 7 (if not, it is brought up to this value). Then the volume is made up to one liter with water.

After having heated it to 130° C. for five minutes, the disappearance is noted of 10 to 20% of the clay plaquettes from the rock surface. Those which remain, including those in the pores, show morphological changes consisting of a rounding of their outlines.

An identical sample to the preceding ones was immersed in a beaker containing a mixture of 10% (by weight) of the previous organo-silicon solution and 90% of the previous micro-emulsion.

After heated it to 130° C. for five minutes, the disappearance was noted of nearly the whole of the clay plaquettes from the rock surface.

In the pores themselves about 80% of the plaquettes were eliminated, and those which remained showed very great morphological changes, consisting of a rounding of their outlines.

EXAMPLE 5

An identical sample to the preceding ones was immersed in a beaker containing a solution obtained as follows: 10 grams of salicylic acid and 700 ml of water are put into a beaker. Onto this solution, while stirring briskly, is slowly poured 12 ml of a solution of potassium methylsiliconate at 45% dry extract. The pH of the solution is brought to 4.7, and it is made up to one liter with distilled water.

After being heated to 130° C. for five minutes, 30 to 40% of the clay plaquettes had disappeared from the rock surface. All those which remained, including those in the pores, showed large morphological changes, consisting of a rounding of their outlines.

An identical sample to the preceding ones was immersed in a beaker containing a mixture of 1% (by weight) of the previous solution and 99% of the micro-emulsion previously described. After being heated near to boiling point for 20 minutes, the almost total disappearance was noted of the clay plaquettes, including those inside the rock.

Of course the invention is not limited solely to the application for recovering hydrocarbons, but concerns, in a general way, the elimination of clays whatever the environment and whatever the end-object of the operation.

What is claimed is:

1. A process for eliminating clays from rocks and sedimentary environments comprising applying into said sedimentary environments or rocks organo-silicon compounds selected from:

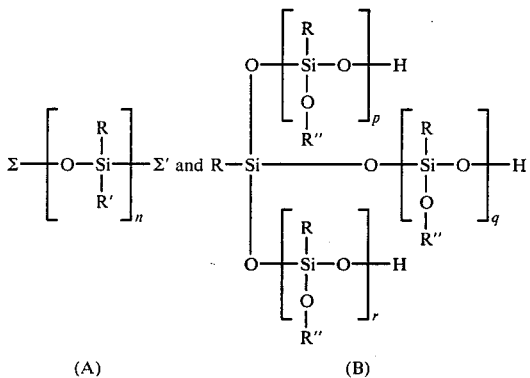

(A) (B)

wherein:

n is a whole number between 1 and 1,000;

p, q and r are whole numbers between 0 and 1,000;

R and R' are selected from the group consisting of aliphatics, cycloaliphatics, olefinics, aromatics; heteroatom-containing aliphatics, cycloaliphatics, olefinics and aromatics; and combinations of the above;

R can also be OH, OR and $OSiR_3$;

$\Sigma$ is selected from R, H, and $SiR_3$;

$\Sigma'$ is selected from R, OR, OH, and $OSiR_3$; and

R'' is selected from R, R', $\Sigma$ and a di or trifunctional polysiloxane chain formation in which the silicon substituents are R, OH or OM, M being a potassium atom.

2. A process according to claim 1, wherein:

$\Sigma$ is selected from R, H and $Si(CH_3)_3$;

$\Sigma'$ is selected from R, OH and $OSi(CH_3)_3$;

n is a whole number between 1 and 50; and p, q, and r are whole numbers between 0 and 50.

3. A process according to claim 1, wherein the organo-silicon compounds are used in aqueous solution or suspensions at a concentration of between 0.001 and 5%.

4. A process according to claim 1 wherein the organo-silicon compounds are used in aqueous solution or suspension at a concentration of between 0.0001 and 30% by weight.

5. A process according to claim 1 wherein the organo-silicon compounds are obtained by means of precursors which generate them by hydrolysis.

* * * * *